US006954244B2

(12) United States Patent  (10) Patent No.: US 6,954,244 B2
Jeon et al.  (45) Date of Patent: Oct. 11, 2005

(54) REFLECTION LIQUID CRYSTAL DISPLAY DEVICE WITH REFLECTION ELECTRODE REGION HAVING TWO WIDTHS

(75) Inventors: Jin Jeon, Anyang-si (KR); Chi-Woo Kim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/415,590
(22) PCT Filed: Aug. 5, 2002
(86) PCT No.: PCT/KR02/01475
§ 371 (c)(1),
(2), (4) Date: Apr. 30, 2003
(87) PCT Pub. No.: WO03/014818
PCT Pub. Date: Feb. 20, 2003

(65) Prior Publication Data
US 2004/0012736 A1 Jan. 22, 2004

(30) Foreign Application Priority Data
Aug. 6, 2001 (KR) ................... 10-2001-0047234

(51) Int. Cl.$^7$ ................ G02F 1/1343; G02F 1/1335
(52) U.S. Cl. ......................... 349/113; 349/138
(58) Field of Search ..................... 349/113, 114, 349/122, 138

(56) References Cited

U.S. PATENT DOCUMENTS

| 4,519,678 | A | * | 5/1985 | Komatsubara et al. ...... 349/160 |
| 5,204,765 | A | * | 4/1993 | Mitsui et al. ............... 349/113 |
| 5,408,345 | A | * | 4/1995 | Mitsui et al. ................ 349/42 |
| 6,104,460 | A | * | 8/2000 | Abe et al. .................... 349/113 |
| 6,172,728 | B1 | * | 1/2001 | Hiraishi ..................... 349/139 |
| 6,233,031 | B1 | * | 5/2001 | Ishitaka ..................... 349/113 |
| 2004/0012736 | A1 | * | 1/2004 | Jeon et al. .................. 349/113 |

* cited by examiner

Primary Examiner—Andrew Schechter
(74) Attorney, Agent, or Firm—McGuireWoods LLP

(57) ABSTRACT

Disclosed is a reflection type liquid crystal display device. A second substrate (220) is provided opposite to a first substrate (210) where pixels are formed. A liquid crystal layer (230) is interposed between the first and second substrates. A reflection electrode (235) is formed on the first substrate (210). The reflection electrode (235) includes first and second regions (290, 295) having relatively high and low heights so as to scatter a light, respectively. The first regions (290) have first widths in a first direction wider than second widths in a second direction so that a reflectivity in the first direction is higher than a reflectivity in the second direction. The widths of the grooves (290a, b) are varied in a desired direction regardless of shapes of the lenses (295), to thereby improve the viewing angle and reflectivity of the display in the specific direction.

28 Claims, 9 Drawing Sheets

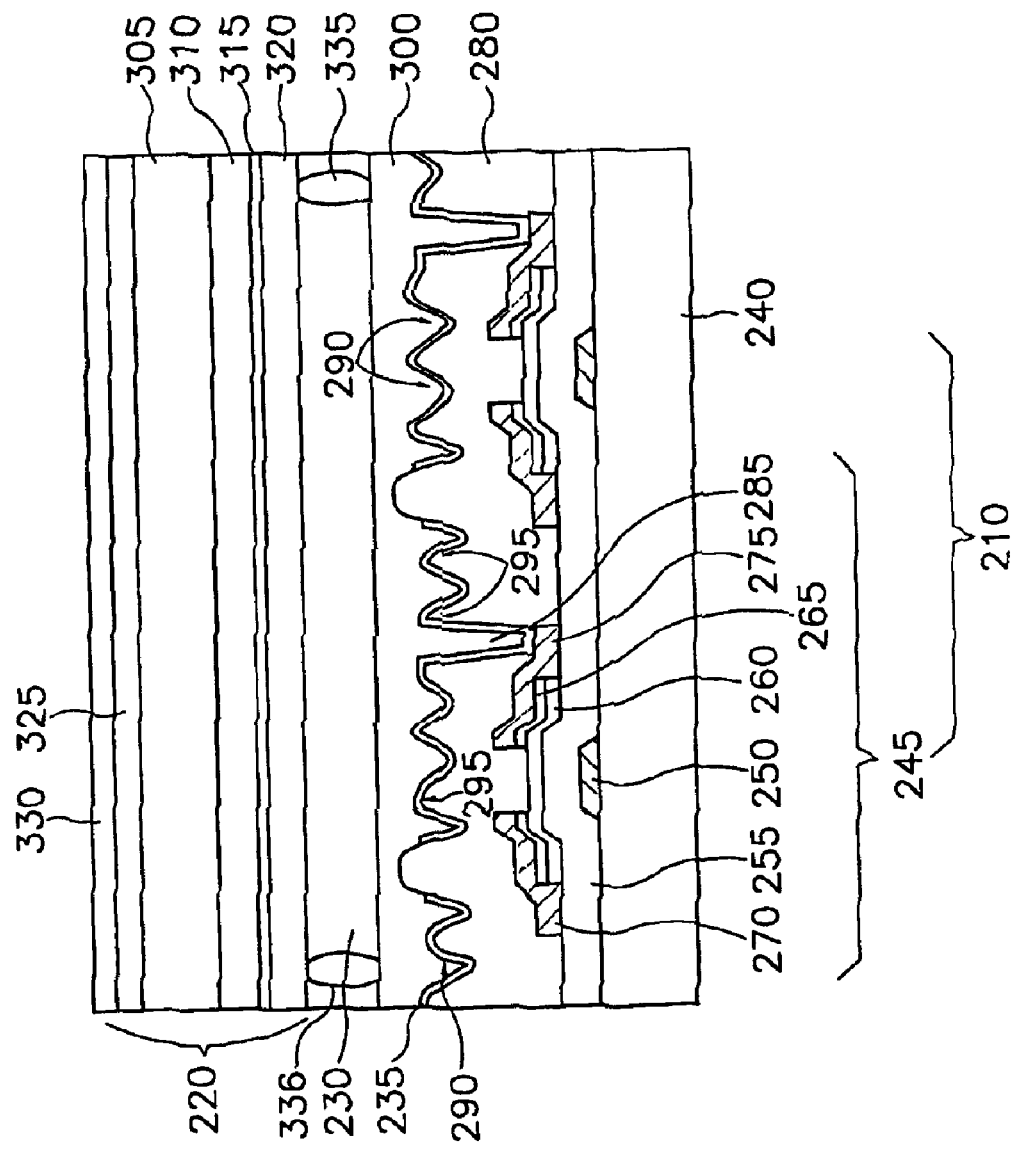

REFLECTION LIQUID CRYSTAL DISPLAY DEVICE WITH REFLECTION ELECTRODE REGION HAVING TWO WIDTHS

TECHNICAL FIELD

The present invention relates to a reflection type liquid crystal display device, and more particularly to a reflection type liquid crystal display device having a reflection electrode on which a plurality of micro lenses are formed.

BACKGROUND ART

In the information society of these days, electronic display devices are more important as information transmission media and various electronic display devices are widely applied for industrial apparatus or home appliances. Such electronic display devices are being continuously improved to have new appropriate functions for various demands of the information society.

In general, electronic display devices display and transmit various pieces of information to users who utilize such information. That is, the electronic display devices convert electric information signals outputted from electronic apparatus into light information signals recognized by users through their eyes.

In the electronic display devices dividing into an emissive display device and a non-emissive display device, the emissive display device displays light information signals through a light emission phenomena thereof and the non-emissive display device displays the light information signals through a reflection, a scattering or an interference thereof. The emissive display device includes a cathode ray tube (CRT), a plasma display panel (PDP), a light emitting diode (LED) and an electroluminescent display (ELD). The emissive display device is called as an active display device. Also, the non-emissive display device, called as a passive display device, includes a liquid crystal display (LCD), an electrochemical display (ECD) and an electrophoretic image display (EPID).

The CRT has been used for a television receiver or a monitor of a computer as the display device for a long time since it has a high quality and a low manufacturing cost. The CRT, however, has some disadvantages such as a heavy weight, a large volume and a high power dissipation.

Recently, the demand for a new electronic display device is greatly increased such as a flat panel display device having excellent characteristics, for example, thin thickness, light weight, low driving voltage and low power consumption. Such flat panel display devices can be manufactured according to the rapidly improved semiconductor technology.

In the flat panel devices, a liquid crystal display (LCD) device has been widely utilized for various electronic devices because the LCD device has thin thickness, low power dissipation and high display quality approximately identical to those of the CRT. Also, the LCD device can be operated under a low driving voltage and can be easily manufactured so that the LCD device is widely used for various electronic apparatuses.

The LCD devices are generally divided into a transmission type LCD device, a reflection type LCD device, and a reflection-transmission type LCD device. The transmission type LCD device displays information by using an external light source and the reflection type LCD device displays information by using a natural light. The reflection-transmission type LCD device operates in a transmission mode for displaying an image using a built-in light source of the LCD device in a room or in a dark place where an external light source does not exist, and operates in a reflection mode for displaying the image by reflecting an incident light in the outside.

The reflection type liquid crystal display device, however, shows relatively dark images and cannot sufficiently apply to display fine pitches or color images, so the reflection type liquid crystal display device has been utilized to only display simple figures or letters. Hence, the reflection type liquid crystal display device should have fine pitches and a high reflectivity as well as display color images in order to be used for various electronic display devices. In addition, the reflection type liquid crystal display device has a sufficient brightness, a rapid response speed, and an improved image contrast.

In the recent reflection type liquid crystal display device, the brightness of the reflection type liquid crystal display device has been improved by means of combining the increase of the reflectivity of the reflection electrode with the super aperture ratio technology. A reflection electrode having numerous fine convexes and concaves is disclosed in U.S. Pat. No. 5,610,741 issued to Naofumi Kimura, entitled "REFLECTION TYPE LIQUID CRYSTAL DISPLAY DEVICE WITH BUMPS ON THE REFLECTOR".

Meanwhile, the present inventors have been developed a reflection electrode causing a uniform diffused reflection to improve the quality of an image and filed this invention in Korean Intellectual Property Office (KIPO) on Mar. 4th, 1999. Such reflection electrode is disclosed in Korean Ser. No. 1999-7093, entitled "A REFLECTION TYPE LIQUID CRYSTAL DISPLAY DEVICE AND A METHOD FOR MANUFACTURING THE SAME" which is now pending in KIPO and is subject to the applicant of this application.

FIG. 1 is a plane view showing a reflection electrode or patterns on a photo mask for forming the reflection electrode according to the above-mentioned application.

Referring to FIG. 1, the reflection electrode includes a first region 14 and second region 16, which have relatively high and low heights in a pixel area. The second region 16 is enclosed with the first region 14 such as closed curves. The first region 14 is formed to have a constant width. The first region 14 has a groove shape having a height relatively lower than the second region 16. The second region 16 has a protuberance shape having a height relatively higher than the first regions 14, so the second region 16 functions as a micro lens.

To form a plurality of micro lenses on the reflection electrode, an organic insulating layer is formed on a first insulating substrate having thin film transistors and then, should be exposed and developed using a photo mask having the patterns shown in FIG. 1.

FIGS. 2A and 2B are cross-sectional views taken along lines of $A_1$–$A_{1'}$ and $B_1$–$B_{1'}$ in FIG. 1, which illustrate a method of forming a plurality of grooves on the organic insulation layer.

Referring to FIGS. 2A and 2B, a photo mask 20 having patterns corresponding to grooves for forming micro lenses is located over an organic insulation layer 12 in order to form a plurality of first regions 14 having the groove shape thereon. In this case, the photo mask 20 has the patterns identical to the shape of the reflection electrode shown in FIG. 1. Specifically, mask patterns corresponding to the first regions 14 are formed on a transparent substrate, thereby forming the photo mask 20 as shown in FIG. 1. After the organic insulation layer 12 is exposed and developed using the photo mask 20, a plurality of grooves 14 (that is, the first regions 14) are formed in the surface of the organic insulation layer 12.

Each of the first regions 14 is formed such that a width $W_a$ in a first direction (that is, the line of $A_1$–$A_1'$ in FIG. 1) is identical to a width $W_b$ in a second direction (that is, the line of $B_1$–$B_1'$ in FIG. 1). Since the first regions 14 are formed to have uniform widths $W_a$ and $W_b$, a reflective efficiency is increased to thereby improve an image quality of the reflection type liquid crystal display device.

The above-mentioned reflection electrode has constant reflectivity concerning all directions including the horizontal and vertical directions because the micro lenses of the reflection electrode (that is, the second regions 16) are isotropically formed in all directions. The reflection electrode, however, cannot be applied to an electronic device demanded to have high reflectivity in a certain direction such as a cellular phone. In case that the entire patterns may be varied in order to increase the reflectivity of the reflection electrode in a specific direction, processing conditions should be optimized once more and other problem such as a symmetry concerning the entire substrates may occur.

DISCLOSURE OF THE INVENTION

The present invention has been made to solve the aforementioned problem, and accordingly it is an object of the present invention to provide a reflection type liquid crystal display device that can control a reflectivity thereof in a specific direction regardless of shapes of lenses.

It is another object of the present invention to provide an electronic display device that can control a reflectivity thereof in a specific direction regardless of shapes of lenses.

To achieve one object of the present invention, there is provided a reflection type liquid crystal display device comprises a first substrate on which pixels are formed, a second substrate disposed opposite to the first substrate, a liquid crystal layer formed between the first substrate and the second substrate, and a reflection electrode formed on the first substrate and has a first region and a second region that have relatively high and low heights for scattering a light. The first region has a first width in a first direction wider than a second width in a second direction in order to have a first reflectivity in the first direction relatively higher than a second reflectivity in the second direction.

In a preferred aspect of the present invention, the first region has a groove shape having a height relatively lower than the second region, and the second region has a protuberance shape having a height relatively higher than the first region. The first region has a first groove successively formed in the first direction and second grooves successively formed in the second direction.

To achieve the other object of the present invention, there is provided an electronic display device comprises an insulation substrate on which pixels are formed, and reflection means connected to the pixels and formed on the first substrate. The reflection means have a plurality of first regions and a plurality of second regions that have relatively high and low heights for scattering a light. The first region has a first width in a first direction wider than a second width in a second direction in order to have a first reflectivity in the first direction relatively higher than a second reflectivity in the second direction.

According to the present invention, the reflection electrode of the reflection type liquid crystal display device has grooves having wide widths in a direction of the pixel where the high reflectivity is demanded. Thus, the reflection type liquid crystal display device has an improved aperture ratio and an increased reflectivity in a specifically desired direction by varying the widths of the grooves regardless of shapes of the lenses.

BRIEF DESCRIPTION OF THE DRAWINGS

The above and other objects and advantages of the present invention will become readily apparent by reference to the following detailed description when considered in conjunction with the accompanying drawings wherein:

FIG. 4 is a cross-sectional view of a reflection type liquid crystal display device having the reflection electrode according to the first embodiment of the present invention;

BEST MODE FOR CARRYING OUT THE INVENTION

Hereinafter, a reflection type liquid crystal display device according to the preferred embodiments of the present invention will be described in detail with reference to the accompanying drawings.

Figure 1:
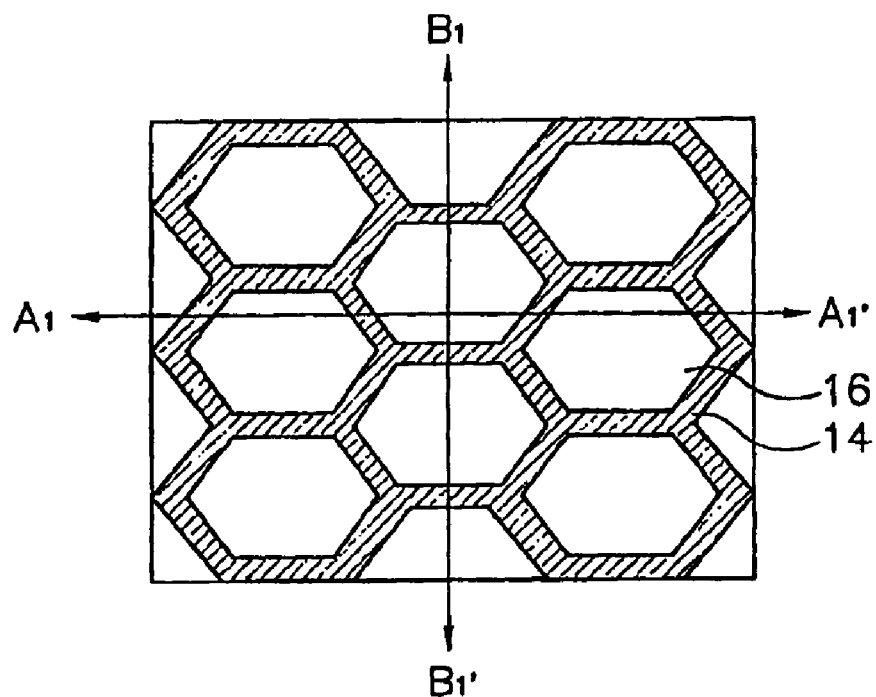
FIG. 1 is a plan view showing a reflection electrode or patterns on a photo mask for forming the reflection electrode disclosed in Korean Ser. No. 1999-7093.
Figure 2A:
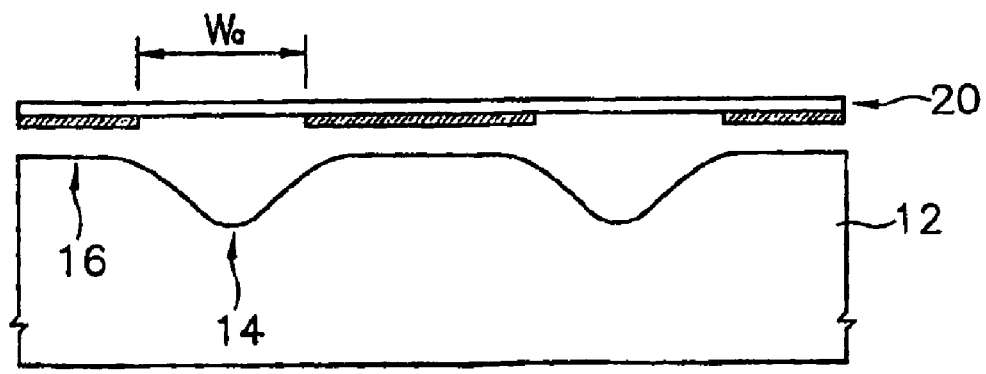
FIGS. 2A and 2B are cross-sectional views taken along lines of $A_1$–$A_1'$ and $B_1$–$B_1'$ in FIG. 1 for illustrating a method of forming a plurality of grooves on an organic insulation layer.
Figure 2B:
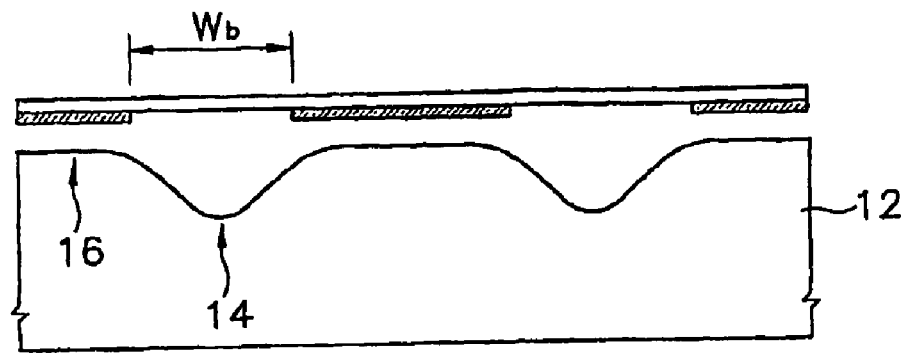
Figure 3:
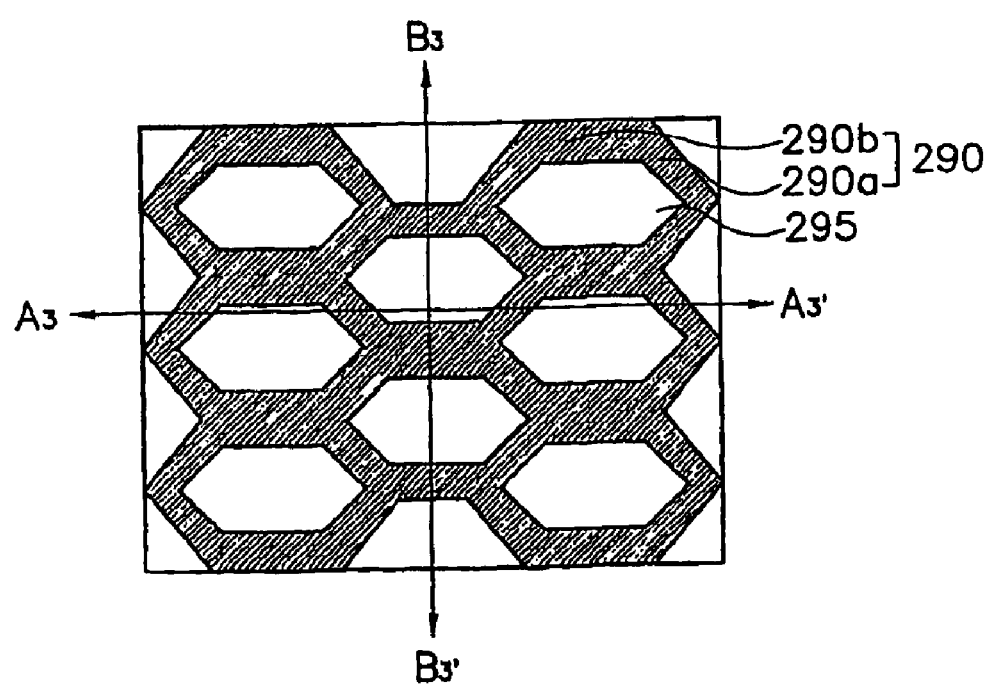
FIG. 3 is a plan view showing a reflection electrode or patterns on a photo mask for forming the reflection electrode according to a first embodiment of the present invention.

FIG. 3 is a plan view showing a reflection electrode or patterns on a photo mask for forming the reflection electrode according to a first embodiment of the present invention.

Referring to FIG. 3, a reflection electrode according to the first embodiment of the present invention has first regions 290 and second regions 295, which are formed within a pixel area and have relatively high and low heights. The first regions 290 include a plurality of first grooves 290a and a plurality of second grooves 290b, wherein the first grooves 290a are continuously formed along a horizontal direction of the pixel area and the second grooves 290b are successively formed in a vertical direction of the pixel area. The second grooves 290b have widths wider than those of the first grooves 290b so that a viewing angle of the display is insured concerning the vertical direction of the pixel area (that is, up and down directions) and a reflectivity is improved.

The first regions 290 are formed in the shape of grooves having heights relatively lower than those of the second regions 295, while the second regions 295 are formed to in the shape of protuberances having heights relative higher than those of the first regions 290, so they play a role of micro lenses.

FIG. 4 is a cross-sectional view illustrating a reflection type liquid crystal display device having the reflection electrode according to the first embodiment of the present invention.

Referring to FIG. 4, the reflection type liquid crystal display device has a first substrate 210, a second substrate 220, a liquid crystal layer 230, and a reflection electrode 235. Pixels are formed on the first substrate 210 and the second substrate 220 is disposed corresponding to the first substrate 210. The liquid crystal layer 230 is formed between the first substrate 210 and the second substrate 220. The reflection electrode 235 is a pixel electrode of the reflection type liquid crystal display device.

The first substrate 210 includes a first insulation substrate 240 and thin film transistors (TFT) 245 formed on the first insulation substrate 240. The thin film transistor 245 functions as a switching element. The thin film transistor 245 has a gate electrode 250, a gate insulation layer 255, an active layer 260, an ohmic contact layer 265, a source electrode 270, and a drain electrode 275.

An organic insulation layer 280 composed of a photosensitive material such as a photoresist is formed on the first insulation layer 240 including the thin film transistors 245. Contact holes 285 are formed through the organic insulation layer 280 to partially expose the drain electrodes 275 of each of the thin film transistors 245.

The reflection electrodes 235 are formed on the contact holes 285 and the organic insulation layer 280. Each of the reflection electrodes 235 is connected to the corresponding drain electrode 275 through the contact holes 285, so that each of the thin film transistors 245 is electrically connected with the corresponding reflection electrode 235.

A first orientation layer 300 is formed on the reflection electrodes 235 and the organic insulation layer 280.

The second substrate 220 is disposed opposite to the first substrate 210 and includes a second insulation substrate 305, a color filter 310, a common electrode 315, a second orientation layer 320, a phase plate 320, and a polarization plate 330.

The second insulation substrate 305 is composed of the material identical to that of the first insulation substrate 240, for example, glass or ceramic. The phase plate 325 and the polarization plate 330 are formed on the second insulation substrate 305, successively. The color filter 310 is disposed beneath the second insulation substrate 305. The common electrode 315 and the second orientation layer 320 are formed beneath the second insulation substrate 305 in turn. The second orientation layer 320 and the first orientation layer 300 of the first substrate 210 play a role of pre-tilting liquid crystal molecules of the liquid crystal layer 230 by a predetermined angle.

Spacers 335 and 336 are interposed between the first substrate 210 and the second substrate 220 to provide a predetermined space between the first substrate 210 and the second substrate 220. The liquid crystal layer 230 is formed in the space between the first substrate 210 and the second substrate 220.

Hereinafter, a method of manufacturing the reflection type liquid crystal display device in FIG. 4 will be described in detail with reference to the accompanying drawings.

FIGS. 5A to 5E are cross-sectional views illustrating a method of manufacturing the reflection type liquid crystal display device in FIG. 4. In FIGS. 5A to 5E, the same reference numerals are used for the elements identical to those in FIG. 4.

Figure 5A:
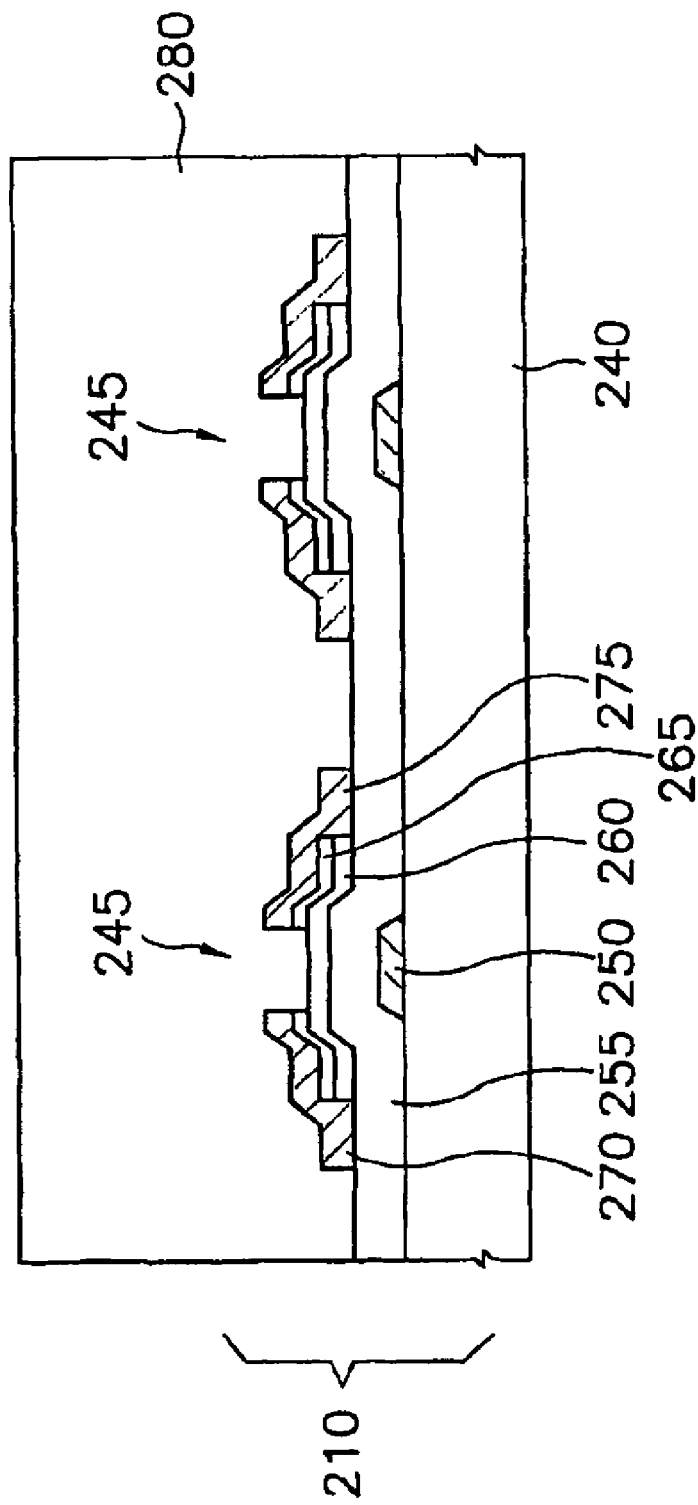
FIGS. 5A to 5E are cross-sectional views illustrating a method of manufacturing the reflection type liquid crystal display device shown in FIG. 4.

Referring to FIG. 5A, a first metal film made of aluminum (Al), chrome (Cr) or molybdenum-tungsten (Mo—W) is formed on a first insulation substrate 240 composed of an insulation material such as glass, ceramic, etc. Then, the first metal film is patterned to form gate lines (not shown) and gate electrodes 250 branched from each of the gate lines. Then, a gate insulation layer 255 composed of silicon nitride is formed on the entire surface of the first insulation substrate 240 including the gate electrodes 250. Preferably, the gate insulation layer 255 is formed by a plasma enhanced chemical vapor deposition (PECVD) method.

After successively depositing an amorphous silicon layer and an in-situ doped amorphous silicon layer on the gate insulation layer 255 by the PECVD method, these amorphous silicon layers are patterned to form active layers 260 and ohmic contact layers 265 on the gate insulation layer 255 under which the gate electrodes 250 are positioned.

Subsequently, after depositing a second metal film made of chrome (Cr) on the resultant structure, the second metal film is patterned to form data lines (not shown), source electrodes 270, and drain electrodes 275, whereby completing thin film transistors 245. Each of the thin film transistors 245 includes the gate electrode 250, the active layer 269, the ohmic contact layer 265, the source electrode 270 and the drain electrode 275. The data line is perpendicular to the gate line, and the source and drain electrodes 270 and 275 are branched from the data line. The gate insulation layer 255 is positioned between the gate line and the data line so that the gate line does not contact with the data line.

Then, a photoresist is coated by a spin coating method on the entire surface of the first insulation substrate 240 on which thin film transistors 245 are formed, thereby forming an organic insulation layer 280 having a thickness of approximately 1 to 3 $\mu$m on the first insulation substrate 240.

Figure 5B:
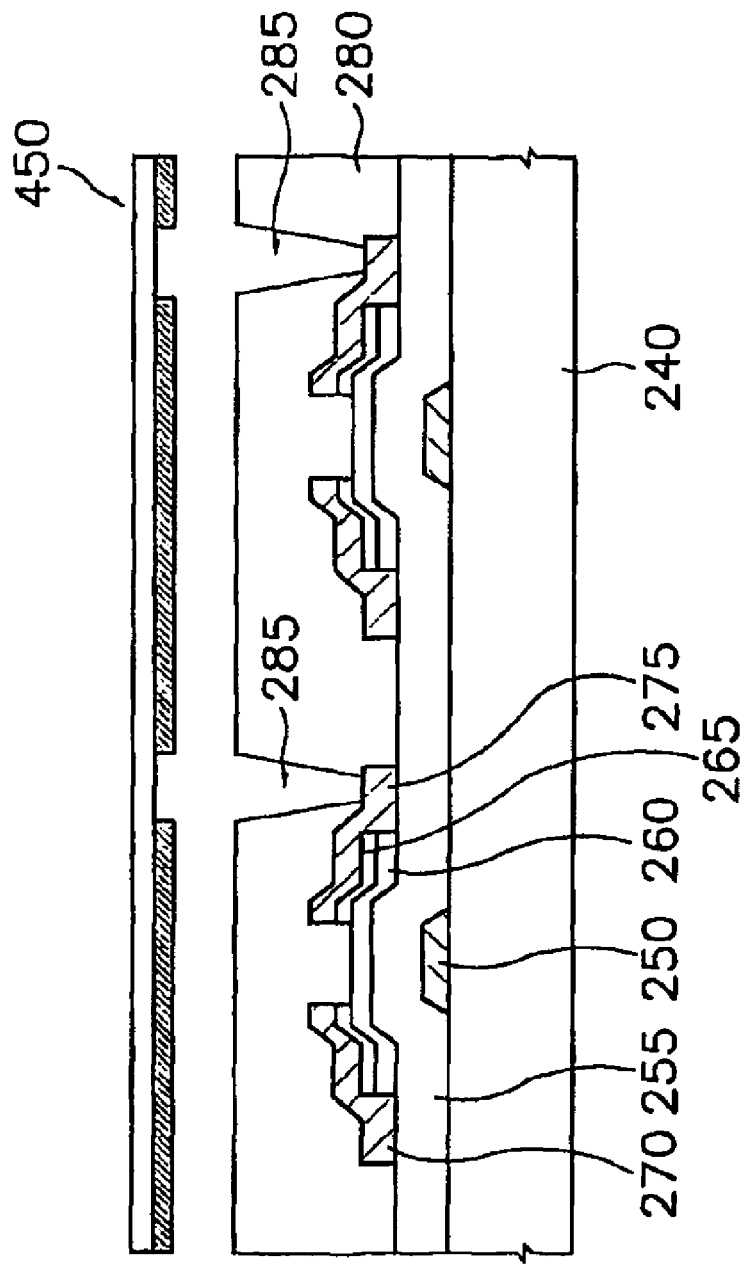

Referring to FIG. 5B, after a first mask 450 for forming contact holes 285 is positioned over the organic insulation layer 280, the organic insulating layer 280 is exposed and developed using the first mask. As a result, the contact holes 285 are formed through the organic insulating layer 280 to partially expose the corresponding drain electrodes 275 and simultaneously, a plurality of grooves are formed at the surface of the organic insulation layer 280. The process of forming the contact holes 285 through the organic insulation layer 280 and the process of forming the grooves in the organic insulation layer 280 will be described as follows.

Figure 5C:
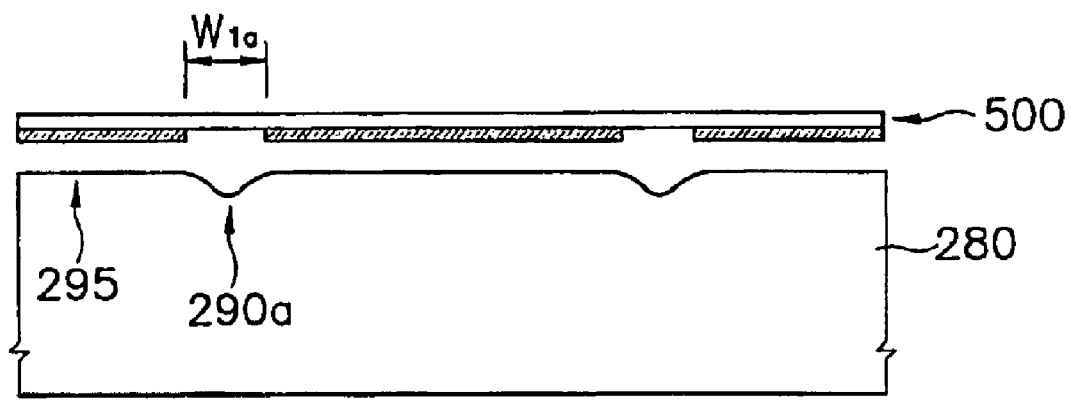
Figure 5D:
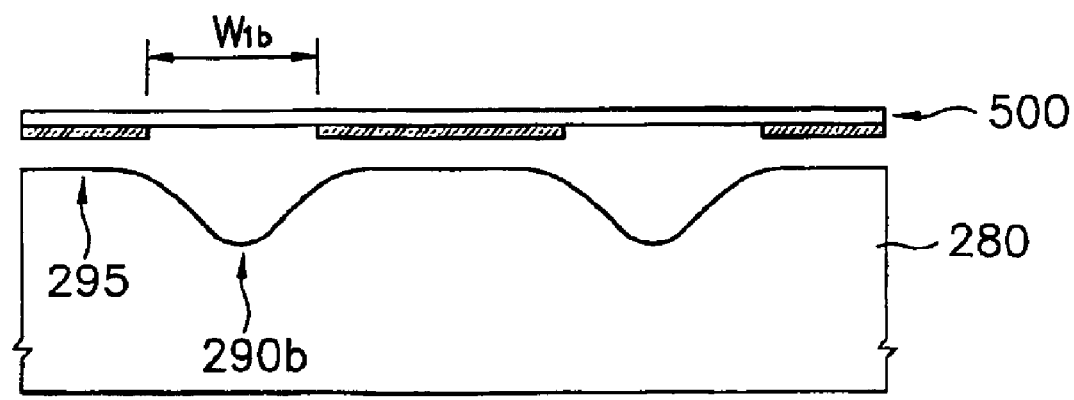

FIGS. 5C and 5D are cross-sectional views taken along lines of $A_3$–$A_{3'}$ and $B_3$–$B_{3'}$ in FIG. 3, which specifically show the process of forming the contact holes 285 in FIG. 4B and the process of forming the grooves, respectively.

First, in order to form the contact holes 285 in the organic insulation layer 280, the first mask 450 (see in FIG. 4B) is located over the organic insulation layer 280 composed of the photo resist. The first mask 450 has patterns corresponding to the contact holes 285. Then, a portion of the organic insulation layer 280 over the drain electrodes 275 is primarily exposed through a full exposure process.

Then, a second mask 500 for forming micro lenses, which has patterns corresponding to the grooves, is positioned over the organic insulation layer 280 in order to form a plurality of grooves 290a and 290b in the surface of the organic insulation layer 280 as shown in FIGS. 5C and 5D. The second mask 500 includes patterns having shapes identical to those of the reflection electrode 235 in FIG. 3. Specifically, the patterns are formed on a transparent substrate so as to have a first widths of the grooves ($W_{1a}$) along a first direction of the pixel (that is, the line of $A_3$–$A_{3'}$ in FIG.

3) are narrower than second widths of the grooves ($W_{1b}$) along a second direction of the pixel (that is, the line of $B_3$–$B_{3'}$ in FIG. 3), thereby completing the second mask 500. The first and second directions of the pixel correspond to the horizontal and vertical directions of the pixel, respectively.

The organic insulation layer 280 except the contact hole 285 is secondarily exposed using the second mask 500 by a lens exposure process (an exposure process for forming lenses).

Then, the organic insulation layer 280 is developed to thereby form the contact holes 285 exposing the corresponding drain electrodes 275 through the organic insulation layer 280 and the grooves in the surface of the organic insulation layer 280. That is, the grooves including first and second grooves 290a and 290b are successively formed in the surface of the organic insulation layer 280, wherein the first grooves 290a having the first width are formed along the first direction (i.e., the horizontal direction) of the pixel and the second grooves 290b having the second width wider than the first width are formed along the second direction (i.e., the vertical direction) of the pixel. Hence, the surface of the organic insulation layer 280 is divided into first regions 290 composed of a plurality of grooves successively formed and second regions 295 made of a plurality of protuberances enclosed with the first regions 290.

Figure 5E:
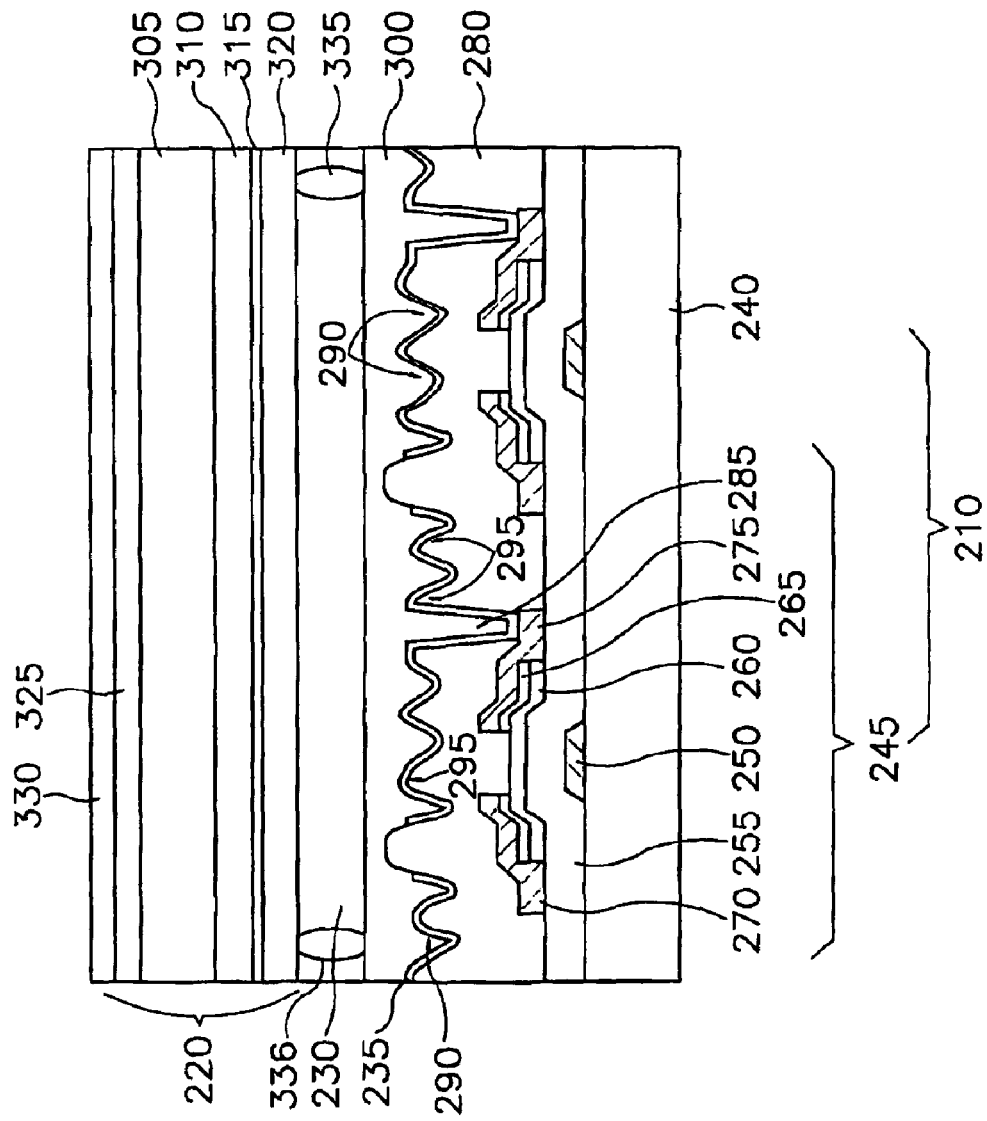

Referring to FIG. 5E, after depositing a third metal film on the organic insulation layer 280 in which the grooves are formed, the third metal film is patterned to form reflection electrodes 235 having shapes of the predetermined pixel as shown in FIG. 4. The third metal film comprises a metal having good reflectivity such as aluminum (Al), nickel (Ni), chrome (Cr), silver (Ag), etc. Then, a photoresist is coated on the reflection electrodes 235 and treated by a rubbing process, thereby forming a first orientation layer 300 that pre-tilts the liquid crystal molecules of a liquid crystal layer 230 by a predetermined angle.

Each of the reflection electrodes 235 has a shape identical to that of the surface of the organic insulation layer 280. The reflection electrode 235 is divided into the first regions 290 having numerous grooves formed on the grooves of the organic insulation layer 280 and the second regions 295 including numerous protuberances, which corresponds to micro lens regions. Preferably, the first regions 290 have the construction in which a plurality of first grooves and a plurality of second grooves are continuously formed. The first grooves having a first width are formed along the first direction (that is, the horizontal direction) of the pixel and the second grooves having a second width wider than the first width are formed along the second direction (that is, the vertical direction) of the pixel. According to the reflection electrode having the above structure, the viewing angle and the reflectivity of the display is improved in the upward and downward directions because the second grooves along the second direction (i.e., the vertical direction) is formed to a width wider than that of the first grooves along the first direction (i.e., the horizontal direction).

Now referring to FIG. 5E, a color filter 310, a common electrode 315, and a second orientation layer 320 are successively formed on a second insulation substrate 305 composed of the material identical to that of the first insulation substrate 240, thereby completing a second substrate 220.

After the second substrate 220 is disposed opposite to the first substrate 210, the first and second substrates 210 and 220 are combined with each other by interposing spacers 335 between the first substrate 210 and the second substrate 220. Thus, a predetermined space is provided between the first substrate 210 and the second substrate 220. Then, liquid crystal is introduced into the space between the first substrate 210 and the second substrate 220 by a vacuum injection method to form a liquid crystal layer 230, whereby completing the reflection type liquid crystal display device according to the present embodiment. In this case, a polarization plate 330 and a phase plate 325 may be formed a front face of the second substrate 220. In addition, a black matrix (not shown) may be disposed between the second insulation substrate 305 and the color filter 310.

According to the first embodiment of the present invention, in the reflection electrode 235 composed of a plurality of first regions 290 having a groove shape and a plurality of second region 295 having a protuberance shape, the second grooves 290b formed along the vertical direction of the pixel have the width wider than those of the first grooves 290a formed along the horizontal direction of the pixel in the first regions 290. Therefore, the viewing angle of the display is secured along the upward and downward directions and the reflectivity of the display increases in the upward and downward directions of the pixel because the grooves of the reflection electrode 235 formed along the vertical direction of the pixel have the width wider than those of the grooves formed along the horizontal direction of the pixel.

Figure 6:
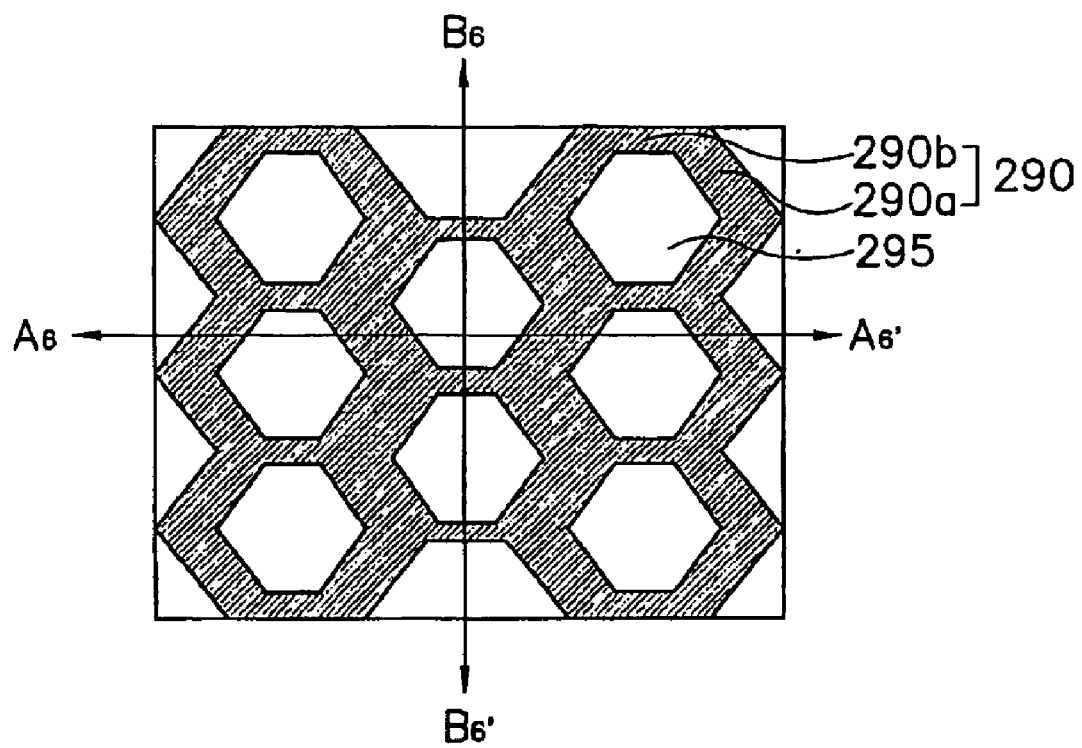
FIG. 6 is a plane view showing a reflection electrode or patterns on a photo mask for forming the reflection electrode according to a second embodiment of the present invention.

FIG. 6 is a plan view showing a reflection electrode or patterns on a photo mask for forming the reflection electrode according a second embodiment of the present invention.

Referring to FIG. 6, a reflection electrode of the present embodiment is divided into first regions 290 and second regions 295, which have relatively high and low heights in a pixel area. The first regions 290 have a groove shape that have a height relatively lower than the second regions 295, and the second regions 295 have a protuberance shape that have a height relatively higher than the first regions 290, so the second regions 295 function as micro lenses.

The first regions 290 include a plurality of first grooves 290a continuously formed along the horizontal direction of the pixel and a plurality of second grooves 290b successively formed along the vertical direction of the pixel. The first grooves 290a have widths wider than those of the second grooves 290b, respectively. Thus, the viewing angle of the display is secured along the left and right directions of the pixel and the reflectivity of the display increases in the left and the right directions of the pixel because the grooves formed along the horizontal direction of the pixel have the width wider than the width of grooves formed along the vertical direction of the pixel.

A method of forming numerous grooves on an organic insulation layer in order to provide the reflection electrode having the above-mentioned construction will be described as follows.

Figure 7A:
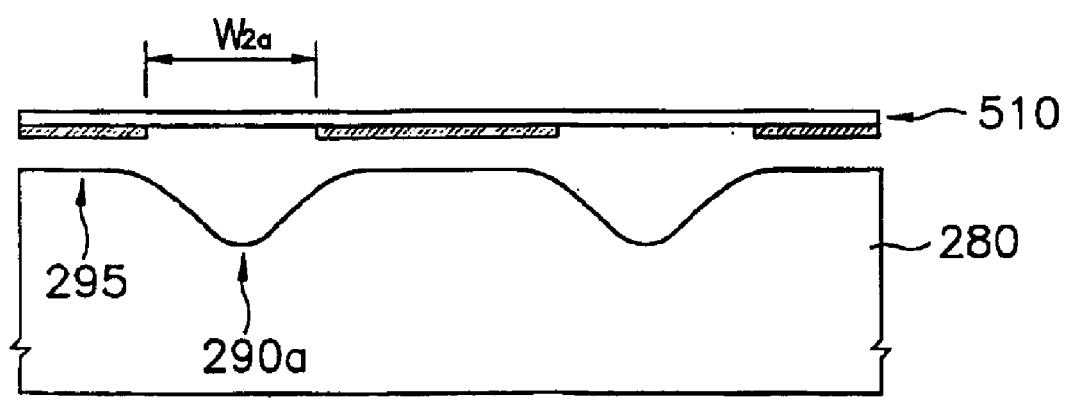
FIGS. 7A and 7B are cross-sectional views taken along lines of $A_6$–$A_6'$ and $B_6$–$B_6'$ in FIG. 6 for illustrating a method of forming a plurality of grooves on an organic insulation layer.
Figure 7B:
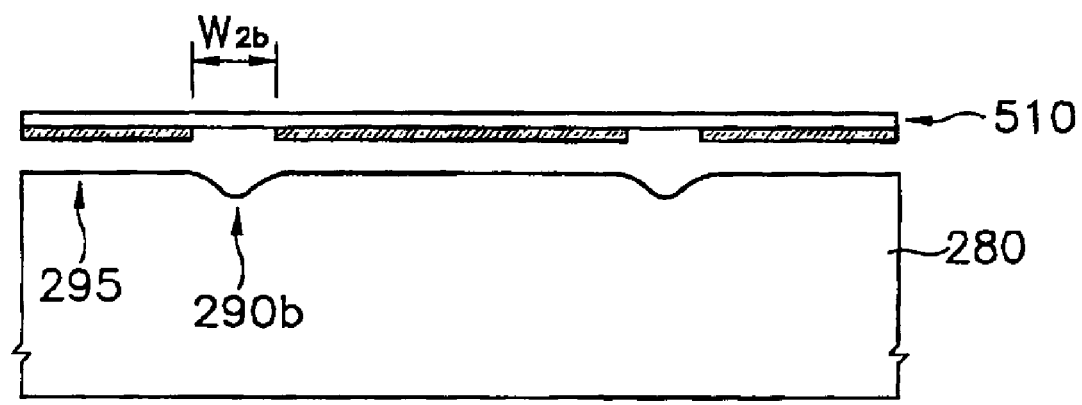

FIG. 7A is a cross-sectional view taken a line of $A_6$–$A_{6'}$ in FIG. 6 and FIG. 7B is a cross-sectional view taken a line of $B_6$–$B_{6'}$ in FIG. 6, which illustrate the method of forming numerous grooves on the organic insulation layer.

Referring to FIGS. 7A and 7B, in order to form a plurality of grooves 290a and 290b in the organic insulation layer 280, a mask 510 for forming micro lenses, which has patterns corresponding to numerous grooves, is disposed over an organic insulation layer 280. Specifically, mask patterns are formed on a transparent substrate so as to have a width ($W_{2a}$) of grooves along a first direction of the pixel (that is, the line of $A_6$–$A_{6'}$ in FIG. 6) are wider than a width ($W_{2b}$) of grooves a second direction of the pixel (that is, the line of $B_6$–$B_{6'}$ in FIG. 6), thereby completing the mask 510.

The first and second directions of the pixel correspond to the horizontal and vertical directions of the pixel, respectively.

After the organic insulation layer 280 is exposed and developed using the mask 510 by a lens exposure process, numerous grooves are continuously formed in the surface of the organic insulation layer 280. That is, the first grooves 290a having first widths are formed along the first direction of the pixel (i.e., the horizontal direction of the pixel), and the second grooves 290b having second widths are simultaneously formed along the second direction of the pixel (i.e., the vertical direction of the pixel). Preferably, the first widths of the first grooves 290a are wider than the second widths of the second grooves 290b. Hence, the surface of the organic insulation layer 280 is divided into the first regions 290 composed of numerous grooves successively formed and the second regions 295 composed of numerous protuberances enclosed by the first regions 290.

According to the present invention as described above, grooves of the reflection electrode are formed so as to have a wide width in a direction of the pixel where the high reflectivity is demanded. Thus, the widths of the grooves are varied in a desired direction regardless of shapes of the lenses, to thereby secure the viewing angle of the display along the specific direction and increase the reflectivity in the specific direction.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A liquid crystal display device, comprising:
  a first substrate on which pixels are formed, the first substrate including a photosensitive insulation layer thereon;
  a second substrate disposed opposite to the first substrate;
  a liquid crystal layer formed between the first substrate and the second substrate; and
  a reflection electrode formed on the photosensitive insulation layer, the reflection electrode including first and second regions that have relatively high and low heights to scatter a light on the first substrate,
  wherein the first region has a first width in a first direction wider than a second width in a second direction in order to have a first reflectivity in the first direction relatively higher than a second reflectivity in the second direction, and
  wherein the first region has a first depth in the first direction greater then a second depth in the second direction.

2. The liquid crystal display device of claim 1, wherein the first region has a groove shape having a height relatively lower than a height of the second region, and the second region has a protuberance shape having a height relatively higher than the height of the first region.

3. The liquid crystal display device of claim 1, wherein the first region is comprised of a first groove continuously formed in the first direction and a second groove continuously formed in the second direction.

4. The liquid crystal display device of claim 1, wherein the second region is enclosed by the first region.

5. The liquid crystal display device of claim 1, wherein the first direction is a horizontal direction of the pixel and the second direction is a vertical direction of the pixel.

6. The liquid crystal display device of claim 1, wherein the first direction is a vertical direction of the pixel and the second direction is a horizontal direction of the pixel.

7. The liquid crystal display device of claim 1, wherein the pixels are comprised of thin film transistors serving as switching elements.

8. The liquid crystal display device of claim 1, wherein the photosensitive insulation layer has a same structure as in the reflection electrode.

9. The liquid crystal display device as claim 1, wherein the reflection electrode is comprised of any one selected from the groups of aluminum (Al), nickel (Ni), chrome (Cr) and silver (Ag).

10. A liquid crystal display device, comprising:
  an insulation substrate;
  a thin film transistor formed on the insulation substrate, the thin film transistor including a gate electrode, a gate insulation layer, an active layer, a source electrode and a drain electrode;
  a photosensitive insulation layer formed on the insulation substrate and the thin film transistors, the photosensitive insulation layer having a contact hole exposing a portion of the drain electrode; and
  a reflection electrode formed on the photosensitive insulation layer so as to be connected to the drain electrode through the contact hole, the reflection electrode including first and second regions which have relatively high and low heights to scatter a light;
  wherein the first region has a first width in a first direction wider than a second width in a second direction in order to have a first reflectivity in the first direction relatively higher than a second reflectivity in the second direction, and
  wherein the first region has a first depth in the first direction greater then a second depth in the second direction.

11. The liquid crystal display device of claim 10, wherein the first region has a groove shape having a height relatively lower than a height of the second region, and the second region has a protuberance shape having a height relatively higher than the height of the first region.

12. The liquid crystal display device of claim 10, wherein the first region comprises a first groove continuously formed in the first direction and a second groove continuously formed in the second direction.

13. The liquid crystal display device of claim 10, wherein the second region is enclosed with the first region.

14. The liquid crystal display device of claim 10, wherein the photosensitive insulation layer has a same structure as in the reflection electrode.

15. The liquid crystal display device as claim 10, wherein the reflection electrode is comprised of any one selected from the groups of aluminum (Al), nickel (Ni), chrome (Cr) and silver (Ag).

16. An electronic display device, comprising:
  an insulation substrate on which pixels are formed, the insulation substrate having a photosensitive insulation layer thereon; and
  a reflection unit formed on the photosensitive insulation layer so as to be connected to the pixels, the reflection unit having a plurality of first regions and a plurality of second regions which have relatively high and low heights to scatter a light;
  wherein the first region has a first width in a first direction wider than a second width in a second direction in order to have a first reflectivity in the first direction relatively higher than a second reflectivity in the second direction, and
  wherein the first region has a first depth in the first direction greater than a second depth in the second direction.

17. The electronic display device of claim 16, wherein the first region has a groove shape having a height relatively lower than a height of the second region, and the second region has a protuberance shape having a height relatively higher than the heights of the first region.

18. The electronic display device of claim 16, wherein the first region comprises a first grooves continuously formed in the first direction and second grooves continuously formed in the second direction.

19. The electronic display device of claim 16, wherein the first direction is a horizontal direction of the pixel and the second direction is a vertical direction of the pixel.

20. The electronic display device of claim 16, wherein the first direction is a vertical direction of the pixel and the second direction is a horizontal direction of the pixel.

21. A method of manufacturing a liquid crystal display device, comprising:

forming a thin film transistor on a first insulation substrate;

coating a photosensitive insulation material on the first insulation substrate on which the thin film transistor is formed;

forming a contact hole, a plurality of first grooves having a first width along a first direction and a plurality of second grooves having a second width along a second direction on the coated photosensitive insulation material to form a photosensitive insulation layer;

depositing a metal on the photosensitive insulation layer;

patterning the deposited metal to form a reflection electrode;

forming a common electrode on a second insulation substrate; and interposing a liquid crystal into a space between the first insulation substrate having the reflection electrode and the second insulation substrate having the common electrode, wherein a first depth of each of the first grooves is greater than a second depth of each of the second grooves.

22. The method of claim 21, wherein the photosensitive insulation material is coated by a spin coating method.

23. The method of claim 21, wherein the photosensitive insulation layer is formed by:

exposing the coated photosensitive insulation material using a first mask having a pattern corresponding to the contact hole;

exposing the exposed photosensitive insulation material using a second mask having patterns corresponding to the grooves; and developing the photosensitive insulation material.

24. The method of claim 23, wherein the coated photosensitive insulation material is exposed through a full exposure process.

25. The method of claim 23, wherein the exposed photosensitive insulation material is exposed through a lens exposure process.

26. A liquid crystal display device, comprising:

a first substrate on which pixels are formed, the first substrate including a photosensitive insulation layer thereon;

a second substrate disposed opposite to the first substrate;

a liquid crystal layer formed between the first substrate and the second substrate; and a reflection electrode formed on the photosensitive insulation layer, the reflection electrode including first and second regions, that have relatively high and low heights for scattering a light on the first substrate, wherein the second region is higher than the first region and is enclosed by the first region;

wherein a plan view of the second region has a polygonal shape of more than four sides;

wherein the first region has a first width in a first direction wider than a second width in a second direction in order to have a first reflectivity in the first direction relatively higher than a second reflectivity in the second direction, and wherein the first region has a first depth in the first direction greater than a second depth in the second direction.

27. A liquid crystal display device, comprising:

an insulation substrate;

a thin film transistor formed on the insulation substrate, the thin film transistor including a gate electrode, a gate insulation layer, an active layer, a source electrode and a drain electrode;

a photosensitive insulation layer formed on the insulation substrate and the thin film transistor, the photosensitive insulation layer having a contact hole exposing a portion of the drain electrode; and a reflection electrode formed on the photosensitive insulation layer so as to be connected to the drain electrode through the contact hole, the reflection electrode including first and second regions, which have relatively high and low heights for scattering a light;

wherein the second region is higher than the first region and is enclosed by the first region;

wherein a plan view of the second region has a polygonal shape of more than four sides;

wherein the first region has a first width in a first direction wider than a second width in a second direction in order to have a first reflectivity in the first direction relatively higher than a second reflectivity in the second direction, and wherein the first region has a first depth in the first direction greater than a second depth in the second direction.

28. An electronic display device, comprising:

an insulation substrate on which pixels are formed, the first substrate including a photosensitive insulation layer thereon; and reflection means formed on the photosensitive insulation layer so as to be connected to the pixels, the reflection means having a plurality of first regions and a plurality of second regions, which have relatively high and low heights for scattering a light;

wherein the second region is higher than the first region and is enclosed by the first region;

wherein a plan view of the second region has a polygonal shape of more than four sides;

wherein the first region has a first width in a first direction wider than a second width in a second direction in order to have a first reflectivity in the first direction relatively higher than a second reflectivity in the second direction, wherein the first region has a first depth in the first direction greater than a second depth in the second direction.

* * * * *